US012652100B2

(12) United States Patent
Zhu

(10) Patent No.: US 12,652,100 B2
(45) Date of Patent: Jun. 9, 2026

(54) DATA TRANSMISSION METHOD AND APPARATUS BASED ON SATELLITE COMMUNICATION, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 738 days.

(21) Appl. No.: 18/002,821

(22) PCT Filed: Jul. 17, 2020

(86) PCT No.: PCT/CN2020/102861
§ 371 (c)(1),
(2) Date: Dec. 21, 2022

(87) PCT Pub. No.: WO2022/011719
PCT Pub. Date: Jan. 20, 2022

(65) Prior Publication Data
US 2023/0246707 A1      Aug. 3, 2023

(51) Int. Cl.
*H04B 7/185*          (2006.01)
(52) U.S. Cl.
CPC ................................. *H04B 7/18513* (2013.01)
(58) Field of Classification Search
CPC .......................... H04B 7/18513; H04B 7/1851
See application file for complete search history.

(56) References Cited

U.S. PATENT DOCUMENTS

| | | | | |
|---|---|---|---|---|
| 6,512,920 B1 * | 1/2003 | Yaoya | ............... | H04B 7/18541 |
| | | | | 455/427 |
| 2006/0133314 A1 | 6/2006 | Lee et al. | | |
| 2010/0323749 A1 * | 12/2010 | Lee | ................... | H04W 36/0069 |
| | | | | 455/524 |
| 2016/0323800 A1 * | 11/2016 | Ulupinar | .............. | H04B 7/1851 |
| 2021/0195405 A1 * | 6/2021 | Gurumoorthy | ....... | H04W 48/10 |

(Continued)

FOREIGN PATENT DOCUMENTS

| | | |
|---|---|---|
| CN | 105743562 A | 7/2016 |
| CN | 107920375 A | 4/2018 |
| CN | 108112281 A | 6/2018 |

(Continued)

OTHER PUBLICATIONS

ISA State Intellectual Property Office of the People's Republic of China, International Search Report Issued in Application No. PCT/CN2020/102861, Apr. 16, 2021, WIPO, 4 pages.

(Continued)

*Primary Examiner* — Fred A Casca
(74) *Attorney, Agent, or Firm* — Vople Koenig

(57)          ABSTRACT

A data transmission method, apparatus, and storage medium that improves the efficiency of data transmission and availability of satellite communications. The efficiency and availability are improved by reporting auxiliary information to a first satellite, where the auxiliary information is information related to reporting data by the terminal; and receiving target information associated with the auxiliary information, where the target information is for the terminal reporting data.

15 Claims, 10 Drawing Sheets

(56) References Cited

U.S. PATENT DOCUMENTS

| | | | | |
|---|---|---|---|---|
| 2022/0069902 A1* | 3/2022 | Fan | ........................ | H04W 36/38 |
| 2022/0248469 A1* | 8/2022 | Cao | ........................ | H04L 5/0044 |

FOREIGN PATENT DOCUMENTS

| | | | |
|---|---|---|---|
| CN | 110198563 | A | 9/2019 |
| CN | 110572856 | A | 12/2019 |
| CN | 110621078 | A | 12/2019 |
| CN | 111106865 | A | 5/2020 |
| CN | 111356192 | A | 6/2020 |

OTHER PUBLICATIONS

State Intellectual Property Office of the People's Republic of China, Office Action and Search Report Issued in Application No. 2020800015509, Sep. 28, 2021, 21 pages. (Submitted with Machine/ Partial Translation).
State Intellectual Property Office of the People's Republic of China, Office Action and Search Report Issued in Application No. 2020800015509, May 16, 2022, 14 pages. (Submitted with Machine/ Partial Translation).
State Intellectual Property Office of the People's Republic of China, Office Action and Search Report Issued in Application No. 2020800015509, Aug. 30, 2022, 10 pages. (Submitted with Machine/ Partial Translation).

* cited by examiner

| Second Satellite | Terminal | First Satellite |
|---|---|---|

Step 401, Report auxiliary
information to a first satellite

Step 402, Determine
target information for the
terminal based on the
auxiliary information Step 403, Send the target
information to the terminal Step 404, Send target access
information to the terminal Step 405, In response to reaching
the starting time point of the
second period, access the second
satellite according to the target
access information Step 406, Report data to the second
satellite on one or more resources
indicated by the resource location
information

FIG. 8

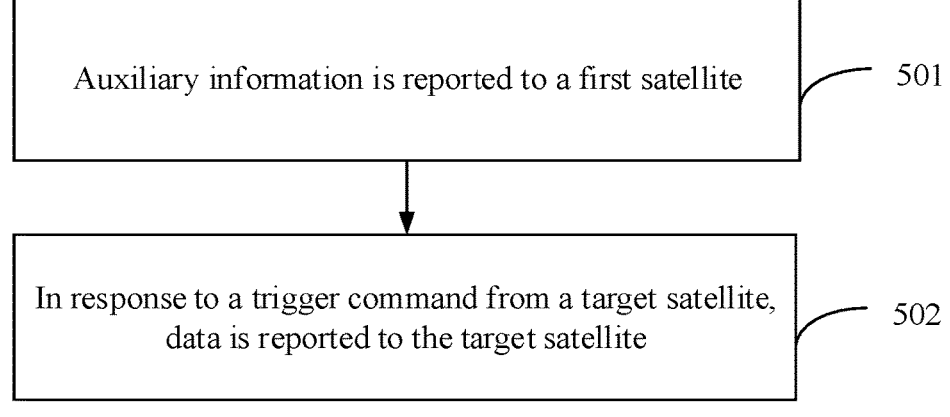

Auxiliary information is reported to a first satellite          501

In response to a trigger command from a target satellite,
data is reported to the target satellite          502

FIG. 9

| Second Satellite | Terminal | First Satellite |
|---|---|---|

Step 701, Report auxiliary information to a first satellite

Step 702, Determine a satellite that covers an area where the terminal is located at a starting time point of the first period as the target satellite Step 703, Send a trigger command to the terminal at the starting time point of the first period Step 704, In response to that the trigger command includes at least a terminal identifier of the terminal, report data to the first satellite Step 705, Transmit notification signaling to the second satellite at the starting time point of the first period Step 706, Send a trigger command to the terminal Step 707, In response to that the trigger command includes at least a terminal identifier of the terminal, report data to the second satellite

FIG. 14

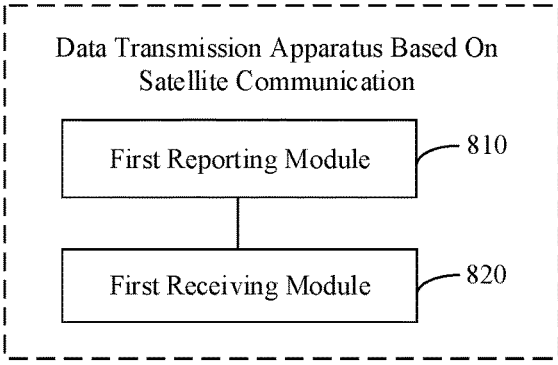

Data Transmission Apparatus Based On Satellite Communication

First Reporting Module ⌐ 810

First Receiving Module ⌐ 820

FIG. 15

DATA TRANSMISSION METHOD AND APPARATUS BASED ON SATELLITE COMMUNICATION, AND STORAGE MEDIUM

CROSS REFERENCE TO RELATED APPLICATIONS

This application is the national phase of International Application No. PCT/CN2020/102861, filed on Jul. 17, 2020, the disclosure of which is hereby incorporated by reference in its entirety.

TECHNICAL FIELD

The present disclosure relates to the field of communication technologies, and in particular to a data transmission method and apparatus based on satellite communication, and a storage medium.

BACKGROUND OF THE INVENTION

In the research of wireless communication technologies, satellite communication is considered an important aspect of the development of the wireless communication technologies in the future. Satellite communication refers to communication performed by radio communication equipment on the ground, for example, terminals, by using satellites as relays. A satellite communication system consists of a satellite part and a ground part. Characteristics of the satellite communication include: a range of communication that is relatively large, that is, the communication can be performed between any two points as long as the two points are within a range covered by radio waves emitted by the satellites; and it is not easily affected by land disasters, and thus the reliability of the satellite communication is relatively high. In addition, as a supplement to a current cellular communication system on the ground, the benefits of satellite communication are also obvious.

For areas where the coverage of a cellular system is limited, such as forests and deserts, it is more economical to use the satellite communication. However, in the initial stage of coverage of low-earth orbit satellites (generally referred to as low-earth orbit satellites, that is, satellites in orbit that are relatively close to the earth), due to the limitation of the number of satellites in orbit, it is impossible for the satellite communication system to achieve seamless coverage. In this case, due to the mobility of the low-earth orbit satellites relative to the earth, a coverage period of the satellites in a certain area is limited. If the existing communication mode is adopted, it may lead to situations such as communication latency and the terminal not getting service in time.

SUMMARY OF THE INVENTION

Embodiments of the present disclosure provide a data transmission method and apparatus based on satellite communication, and a storage medium.

According to a first aspect of the present disclosure, a data transmission method based on satellite communication, being applicable to a terminal, is provided, and the method includes: reporting auxiliary information to a first satellite, where the auxiliary information is information related to reporting data by the terminal; and receiving target information associated with the auxiliary information, where the target information is for the terminal reporting data.

According to a second aspect of the present disclosure, a data transmission method based on satellite communication, being applicable to a first satellite, is provided, and the method includes: receiving auxiliary information reported by a terminal, where the auxiliary information is information related to reporting data by the terminal; determining target information for the terminal based on the auxiliary information, where the target information is for the terminal reporting data; and sending the target information to the terminal.

According to a third aspect of the embodiments of the present disclosure, a data transmission method based on satellite communication, being applicable to a first satellite, is provided, and the method includes: receiving auxiliary information reported by a terminal, where the auxiliary information is information related to reporting data by the terminal; determining a target satellite according to the auxiliary information; and transmitting target signaling according to the target satellite.

According to a fourth aspect of the present disclosure, a non-transitory computer-readable storage medium storing a computer program is provided, where the computer program is configured to execute the data transmission method based on satellite communication described in any one of the above first aspect, or the data transmission method based on satellite communication described in any one of the above third aspect.

According to a fifth aspect of the present disclosure, a non-transitory computer-readable storage medium storing a computer program is provided, where the computer program is configured to execute the data transmission method based on satellite communication described in any one of the above second aspect, or the data transmission method based on satellite communication described in any one of the above fourth aspect.

According to a sixth aspect of the embodiments of the present disclosure, a data transmission apparatus based on satellite communication, being applicable to a terminal, is provided, and the apparatus includes: a processor; and a memory for storing instructions executable by the processor, where the processor is configured to execute the data transmission method based on satellite communication described in any one of the above first aspect, or the data transmission method based on satellite communication described in any one of the above third aspect.

According to a seventh aspect of the present disclosure, a data transmission apparatus based on satellite communication, being applicable to a first satellite, is provided, and the apparatus includes: a processor; and a memory for storing instructions executable by the processor, where the processor is configured to execute the data transmission method based on satellite communication described in any one of the above second aspect, or the data transmission method based on satellite communication described in any one of the above fourth aspect.

It should be understood that the above general descriptions and subsequent detailed descriptions are merely illustrative and explanatory, and shall not constitute limitations to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 8 is a schematic flowchart illustrating a data transmission method based on satellite communication according to an embodiment.

FIG. 9 is a schematic flowchart illustrating a data transmission method based on satellite communication according to an embodiment.

FIG. 14 is a schematic flowchart illustrating a data transmission method based on satellite communication according to an embodiment.

FIG. 15 is a block diagram illustrating a data transmission apparatus based on satellite communication according to an embodiment.

DETAILED DESCRIPTION OF THE EMBODIMENTS

Embodiments will be described in detail here, examples of which are illustrated in the accompanying drawings. When the following description refers to the drawings, unless otherwise indicated, the same numerals in different drawings indicate the same or similar elements. The implementations set forth in the following description of embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and are not intended to limit the embodiments of the present disclosure. The singular forms "a," "one," and "the" used in the present disclosure and the appended claims are also intended to include plural forms, unless the context clearly indicates other meanings. It should also be understood that the term "and/or," as used in the present disclosure, refers to and includes any and all possible combinations of one or more of the associated listed items.

It should be understood that, although terms first, second, third, and the like may be adopted to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, the terms "if" and "in case of" used herein may be explained as "while," "when," or "in response to determining," which depends on the context.

In the embodiments of the present disclosure, a terminal can report data to a satellite in any one of the following manners.

In the first manner, the terminal can report data in a reservation manner according to received target information.

Figure 1:
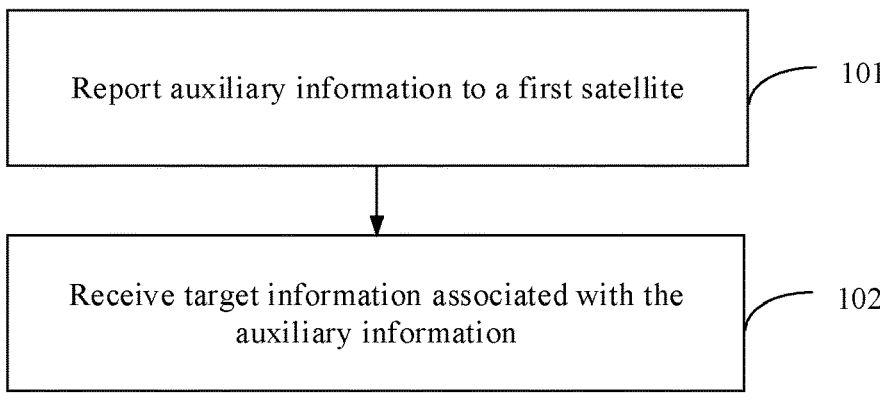
FIG. 1 is a schematic flowchart illustrating a data transmission method based on satellite communication according to an embodiment.

The embodiments of the present disclosure provide a data transmission method based on satellite communication, which is applicable to a terminal. Referring to FIG. 1, FIG. 1 is a schematic flowchart illustrating a data transmission method based on satellite communication according to an embodiment. The method can include the following steps.

In step 101, the auxiliary information is reported to a first satellite.

In the embodiment of the present disclosure, the terminal can determine the auxiliary information according to the service requirements of the terminal, and report the auxiliary information to the first satellite. The auxiliary information is information related to reporting data by the terminal, and the auxiliary information includes, but is not limited to, at least one of: a first period for the terminal performing data reporting, or a data volume for the terminal performing data reporting.

In step 102, target information associated with the auxiliary information is received.

In the embodiment of the present disclosure, the target information is information for the terminal determined by the first satellite based on the auxiliary information reported by the terminal, including but not limited to at least one of: a second period for the terminal reporting data, resource location information for the terminal reporting data, or transmission parameter information for the terminal reporting data. The second period can be the same as or different from the first period, one or more resources indicated by the resource location information can be used to transmit the data volume for the terminal reporting data, and the transmission parameter information can include, but not limited to, a modulation and coding scheme (MCS) such as transmission power and beam for the terminal reporting data.

In the above embodiment, the terminal can report the auxiliary information to the first satellite, where the auxiliary information is information related to reporting data by the terminal. The terminal can receive the target information associated with the auxiliary information, where the target information is for the terminal reporting data. Further, the terminal can report data to the target satellite based on the target information, thereby effectively improving the efficiency of data transmission based on satellite communication and increasing the availability of the communication system.

In an alternative embodiment, the auxiliary information is reported by the terminal through an access procedure of a satellite system.

The access procedure of the satellite system can include, but is not limited to, a two-step or four-step access procedure. Taking the four-step access procedure as an example, in the first step, the terminal sends an access request "msg1" to the first satellite; in the second step, the terminal receives an access response "msg2" from the first satellite; in the third step, the terminal sends a scheduled transmission "msg3" to the first satellite; and in the fourth step, the terminal obtains access information "msg4" for accessing the first satellite, including but not limited to radio network temporary identity (RNTI) information.

The two-step access procedure is that messages sent in the above first and third steps are combined into "msgA" at the terminal side, and then sent to the first satellite; and messages sent in the above second and fourth steps are combined into "msgB" at the first satellite side, and then sent to the terminal.

In the embodiment of the present disclosure, the terminal can send the determined auxiliary information to the first satellite based on the above access procedure of the satellite system, thereby easily realizing and having high availability.

Figure 2:
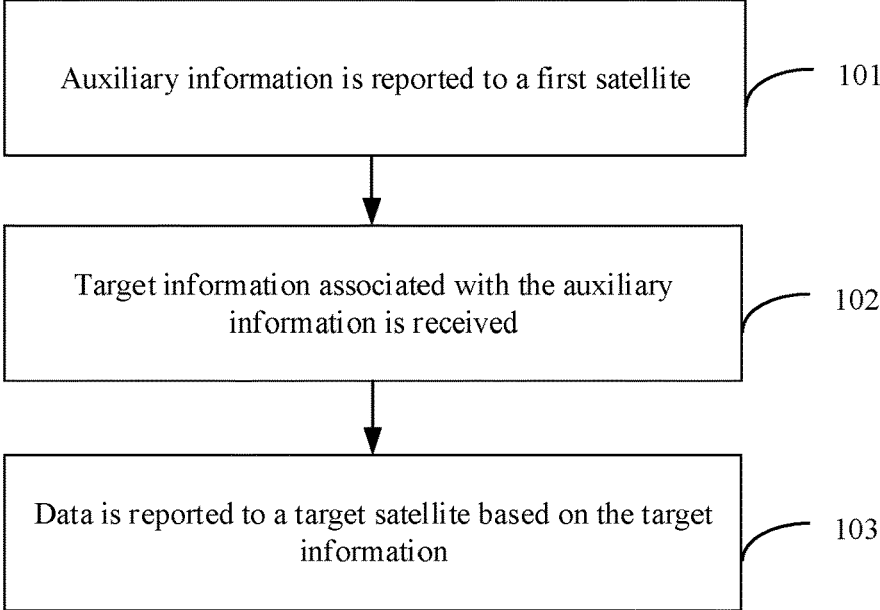
FIG. 2 is a schematic flowchart illustrating a data transmission method based on satellite communication according to an embodiment.

In an alternative embodiment, referring to FIG. 2, FIG. 2 is a schematic flowchart illustrating a data transmission method based on satellite communication according to the embodiment shown in FIG. 1. The method can further include step 103.

In step 103, data is reported to a target satellite based on the target information.

In an example, the target satellite is the first satellite, and in response to determining that the first satellite covers an area where the terminal is located, the terminal can report data to the first satellite.

Step 103 can include: in response to determining that the first satellite covers an area where the terminal is located, reporting data to the first satellite.

In the embodiment of the present disclosure, the terminal can report data to the first satellite when it is determined that the first satellite covers the area where the terminal is located at a starting time point of the second period. Alternatively, the terminal can report data to the first satellite when it is determined that the first satellite covers the area where the terminal is located at any time point in the second period. When reporting data, the terminal can report data to the first satellite on one or more resources indicated by the resource location information.

In the above embodiment, if the target satellite is the first satellite, the terminal can report data to the first satellite when the first satellite covers the area where the terminal is located, thereby avoiding situations such as communication latency and the terminal not getting service in time, and effectively improving the efficiency of data transmission based on satellite communication.

In another example, the target satellite is a second satellite, where the second satellite is a satellite that covers the area where the terminal is located at a starting time point of the second period.

Figure 3:
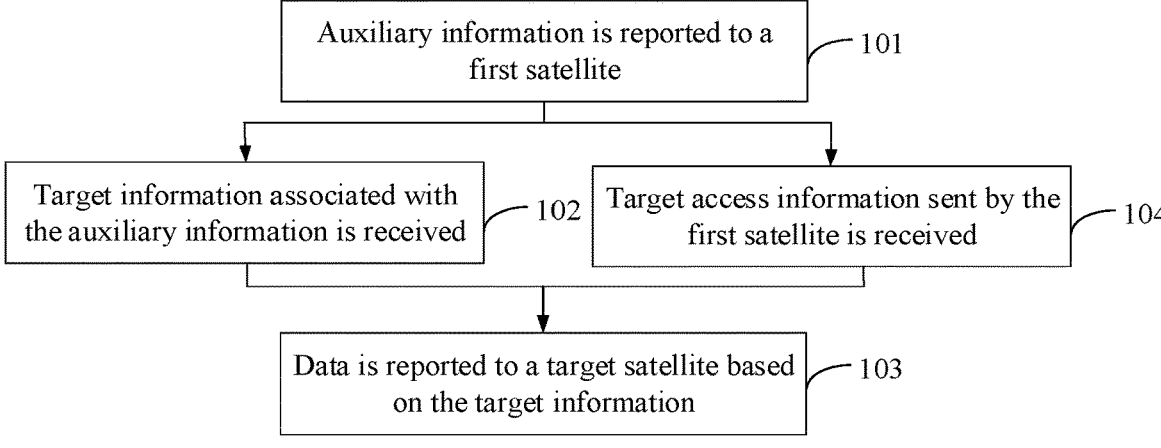
FIG. 3 is a schematic flowchart illustrating a data transmission method based on satellite communication according to an embodiment.

Referring to FIG. 3, FIG. 3 is a schematic flowchart illustrating a data transmission method based on satellite communication according to the embodiment shown in FIG. 2. The method can further include step 104.

In step 104, target access information sent by the first satellite is received.

The target access information is information for accessing the second satellite, including but not limited to at least one of: a satellite identifier of the second satellite, orbit information of the second satellite, operating frequency information of the second satellite, or resource information where a synchronization signal needed by the terminal to perform uplink and downlink synchronization with the second satellite is located.

Accordingly, step 103 can include the following steps.

In step 103-1, in response to reaching the starting time point of the second period, the second satellite is accessed according to the target access information.

In the embodiment of the present disclosure, the terminal can access the second satellite at the starting time point of each second period according to the previously received target access information.

In step 103-2, data is reported to the second satellite.

In the embodiment of the present disclosure, after accessing the second satellite, the terminal can report data to the second satellite. When reporting data, the terminal can report data to the second satellite on one or more resources indicated by the resource location information.

In the above embodiment, the target satellite can be the second satellite, different from the first satellite, and the second satellite is the satellite that covers the area where the terminal is located at the starting time point of the second period. In response to reaching the starting time point of the second period, the terminal can access the second satellite according to the target access information and report data to the second satellite, thereby avoiding situations such as communication latency and the terminal not getting service in time, and effectively improving the efficiency of data transmission based on satellite communication.

Figures 4, 5:
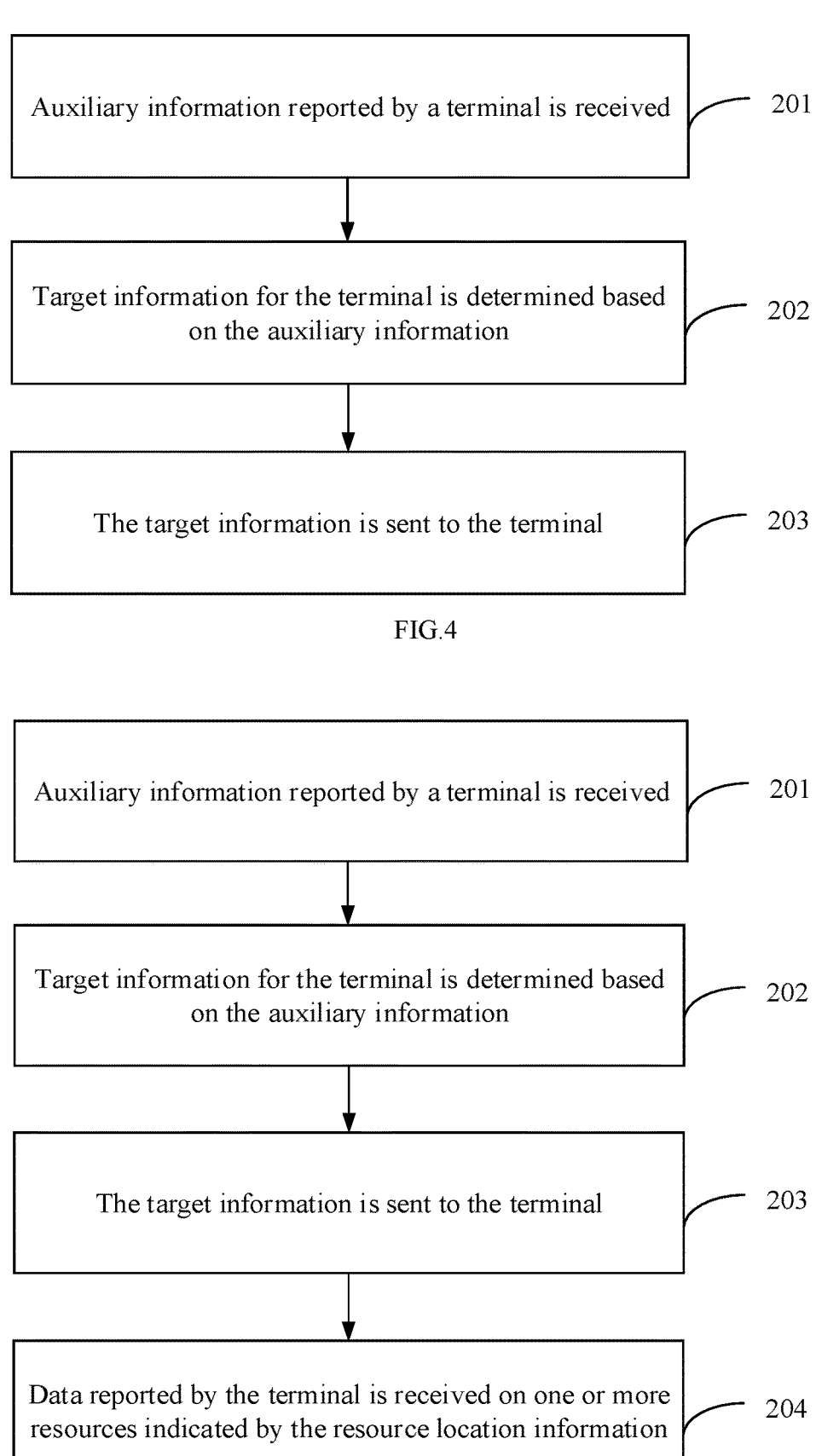
FIG. 4 is a schematic flowchart illustrating a data transmission method based on satellite communication according to an embodiment.
FIG. 5 is a schematic flowchart illustrating a data transmission method based on satellite communication according to an embodiment.

The embodiments of the present disclosure further provide a data transmission method based on satellite communication, which is applicable to a first satellite. Referring to FIG. 4, FIG. 4 is a schematic flowchart illustrating a data transmission method based on satellite communication according to an embodiment. The method can include the following steps.

In step 201, auxiliary information reported by a terminal is received.

The first satellite can receive the auxiliary information reported by the terminal through an access procedure of a satellite system, which is the same as the access procedure provided in the above embodiment; therefore, it will not be repeated here. The auxiliary information is information related to reporting data by the terminal, including but not limited to at least one of: a first period for the terminal performing data reporting, or a data volume for the terminal performing data reporting.

In step 202, the target information for the terminal is determined based on the auxiliary information.

In the embodiment of the present disclosure, the target information is information for the terminal determined by the first satellite based on the auxiliary information reported by the terminal, including but not limited to at least one of:

a second period for the terminal reporting data, resource location information for the terminal reporting data, or transmission parameter information for the terminal reporting data. The second period can be the same as or different from the first period, one or more resources indicated by the resource location information can be used to transmit the data volume for the terminal reporting data, and the transmission parameter information can include, but not limited to, a modulation and coding scheme (MCS) such as transmission power and beam for the terminal reporting data.

In step 203, the target information is sent to the terminal.

In the embodiment of the present disclosure, the terminal will report data to the target satellite based on the received target information.

In the above embodiment, the terminal can report the auxiliary information to the first satellite, and the first satellite can determine the target information for the terminal based on the auxiliary information; further, the terminal can report data to the target satellite based on the target information, thereby effectively improving the efficiency of data transmission based on satellite communication, and having high availability.

In an alternative embodiment, referring to FIG. 5, FIG. 5 is a schematic flowchart illustrating a data transmission method based on satellite communication according to the embodiment shown in FIG. 4. After step 203, the method can further include step 204.

In step 204, data reported by the terminal is received on one or more resources indicated by the resource location information.

In the embodiment of the present disclosure, the first satellite is determined as the target satellite, and the terminal can report data to the first satellite when the first satellite covers the area where the terminal is located. The first satellite can receive data reported by the terminal on one or more resources indicated by the resource location information according to the previously determined target information.

In the above embodiment, the purpose of reporting data to the first satellite by the terminal in the reservation manner according to the determined target information can be realized, and the availability is high.

Figures 6, 7:
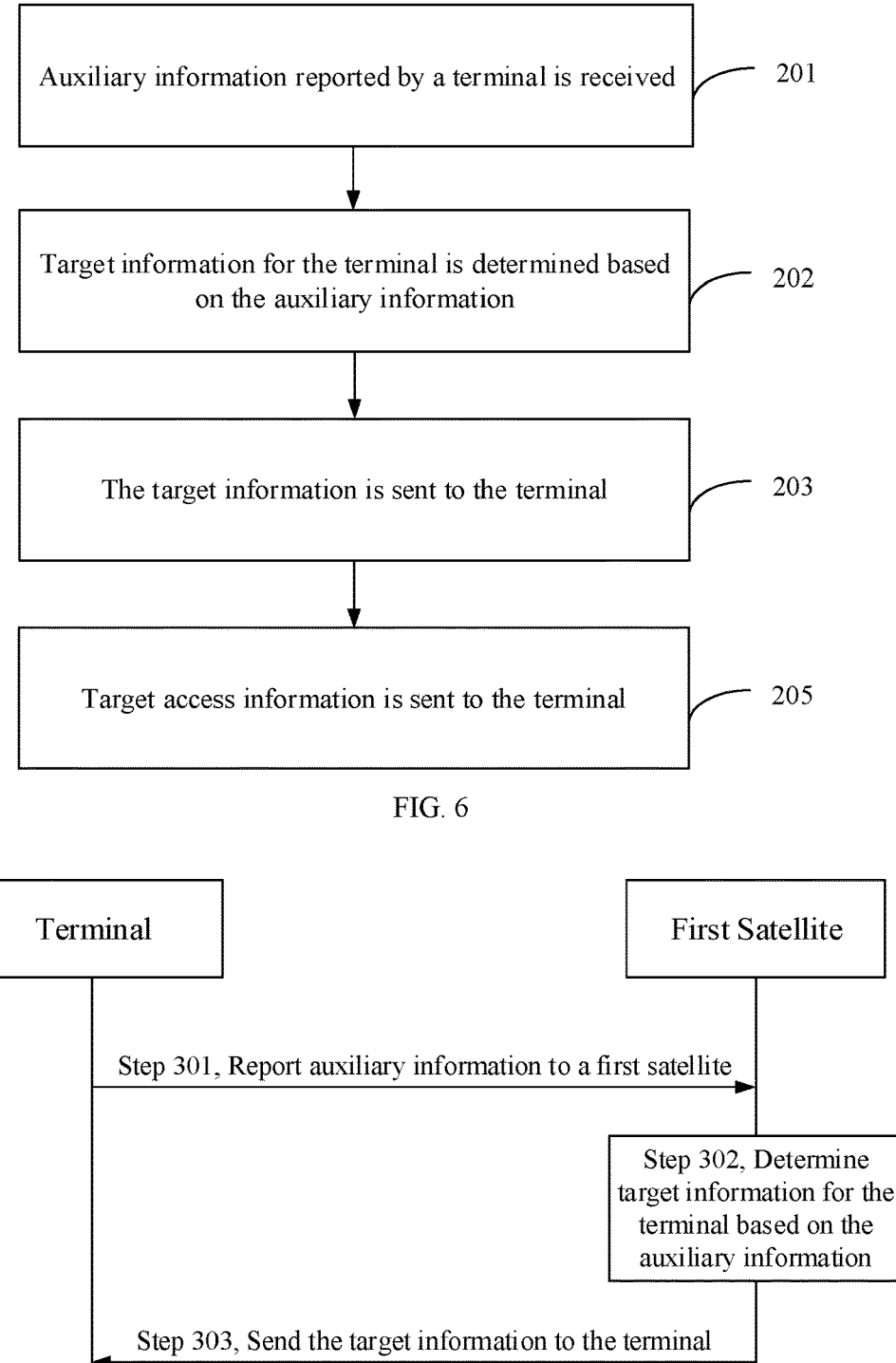
FIG. 6 is a schematic flowchart illustrating a data transmission method based on satellite communication according to an embodiment.
FIG. 7 is a schematic flowchart illustrating a data transmission method based on satellite communication according to an embodiment.

In an alternative embodiment, referring to FIG. 6, FIG. 6 is a schematic flowchart illustrating a data transmission method based on satellite communication according to the embodiment shown in FIG. 4. The method can further include step 205.

In step 205, target access information is sent to the terminal.

The target access information is information for instructing the terminal to access a second satellite, and the second satellite is a satellite that covers the area where the terminal is located at a starting time point of the second period. The target access information can include, but is not limited to, at least one of: a satellite identifier of the second satellite, orbit information of the second satellite, operating frequency information of the second satellite, or resource information where a synchronization signal is needed by the terminal to perform uplink and downlink synchronization with the second satellite is located.

In the embodiment of the present disclosure, the terminal can access the second satellite according to the target access information at the starting time point of each second period; further, the terminal can report data to the second satellite on one or more resources indicated by the resource location information.

In the above embodiment, the purpose of reporting data to the second satellite by the terminal in the reservation manner according to the target information associated with the auxiliary information can be realized, and the availability is high.

In an alternative embodiment, referring to FIG. 7, FIG. 7 is a schematic flowchart illustrating a data transmission method based on satellite communication according to an embodiment. The method can include the following steps.

In step 301, the terminal reports auxiliary information to a first satellite.

The auxiliary information is reported through an access procedure of a satellite system, and is information related to reporting data by the terminal, including at least one of: a first period for the terminal performing data reporting, or a data volume for the terminal performing data reporting.

In step 302, the first satellite determines the target information for the terminal based on the auxiliary information.

The target information is for the terminal reporting data, including but not limited to at least one of: a second period for the terminal reporting data, resource location information for the terminal reporting data, or transmission parameter information for the terminal reporting data.

In step 303, the first satellite sends the target information to the terminal.

In step 304, in response to determining that the first satellite covers an area where the terminal is located, the terminal reports data to the first satellite on one or more resources indicated by the resource location information.

In the above embodiment, the terminal can report data to the first satellite when the first satellite covers the area where the terminal is located, thereby avoiding situations such as communication latency and the terminal not getting service in time, and effectively improving the efficiency of data transmission based on satellite communication.

In an alternative embodiment, referring to FIG. 8, FIG. 8 is a schematic flowchart illustrating a data transmission method based on satellite communication according to an embodiment. The method can include the following steps.

In step 401, the terminal reports auxiliary information to a first satellite.

The auxiliary information is reported through an access procedure of a satellite system, and is information related to reporting data by the terminal, including at least one of: a first period for the terminal performing data reporting, or a data volume for the terminal performing data reporting.

In step 402, the first satellite determines target information for the terminal based on the auxiliary information.

The target information is for the terminal reporting data, including but not limited to at least one of: a second period for the terminal reporting data, resource location information for the terminal reporting data, or transmission parameter information for the terminal reporting data.

In step 403, the first satellite sends the target information to the terminal.

In step 404, the first satellite sends target access information to the terminal.

The target access information is information for accessing a second satellite, and the second satellite is a satellite that covers the area where the terminal is located at a starting time point of each second period configured by the first satellite for the terminal.

In step 405, in response to reaching the starting time point of the second period, the terminal accesses the second satellite according to the target access information.

In step 406, the terminal reports data to the second satellite on one or more resources indicated by the resource location information.

In the above embodiment, in response to reaching the starting time point of the second period, the terminal can access the second satellite according to the target access information and report data to the second satellite, thereby avoiding situations such as communication latency and the terminal not getting service in time, and effectively improving the efficiency of data transmission based on satellite communication.

The above embodiments are all processes of data transmission based on satellite communication in the first manner. In the embodiments of the present disclosure, the following manner can also be adopted for data transmission.

In the second manner, the terminal reports data to the target satellite based on the trigger command sent by the target satellite.

The embodiments of the present disclosure provide a data transmission method based on satellite communication, which is applicable to a terminal. Referring to FIG. 9, FIG. 9 is a schematic flowchart illustrating a data transmission method based on satellite communication according to an embodiment. The method can include the following steps.

In step 501, the auxiliary information is reported to a first satellite.

In the embodiment of the present disclosure, the terminal can determine the auxiliary information according to the service requirements of the terminal, and report the auxiliary information to the first satellite. The auxiliary information is information related to reporting data by the terminal, and the auxiliary information includes, but is not limited to, at least one of: a first period for the terminal performing data reporting, or a data volume for the terminal performing data reporting.

In some examples, the terminal can report the auxiliary information through an access procedure of a satellite system.

In step 502, in response to a trigger command from a target satellite, data is reported to the target satellite. In the embodiment of the present disclosure, the target satellite is a satellite that covers an area where the terminal is located at a starting time point of the first period, and the target satellite can be a first satellite or a second satellite different from the first satellite. The trigger command is used to trigger the terminal to report data, and in some examples, the trigger command can be downlink control information.

In the embodiment of the present disclosure, in response to the trigger command that includes at least a terminal identifier of the terminal, and the terminal can report data to the target satellite. In the embodiment of the present disclosure, if there is service data to be reported, the terminal can report the service data to the target satellite; and if there is no service data to be reported, the terminal can be triggered by the trigger command sent by the target satellite to report some information unrelated to the service data to the target satellite, including but not limited to channel quality measurement information.

In the above embodiment, the terminal can also report the auxiliary information to the first satellite, where the auxiliary information is information related to reporting data by the terminal. In response to the trigger command from the target satellite, the terminal can report data to the target satellite, thereby avoiding situations such as communication latency and the terminal not getting service in time, and effectively improving the efficiency of data transmission based on satellite communication.

In an alternative embodiment, for step 502, any one of the following manners can be adopted.

In the first manner, the terminal can report data to the target satellite according to resource indication information included in the received trigger command.

The trigger command sent by the target satellite includes the resource indication information, and the terminal can report data to the target satellite on one or more resources indicated by the resource indication information included in the trigger command.

In the second manner, the terminal can report data to the target satellite according to the resource indication information included in the target information sent by the first satellite.

Figures 10, 11:
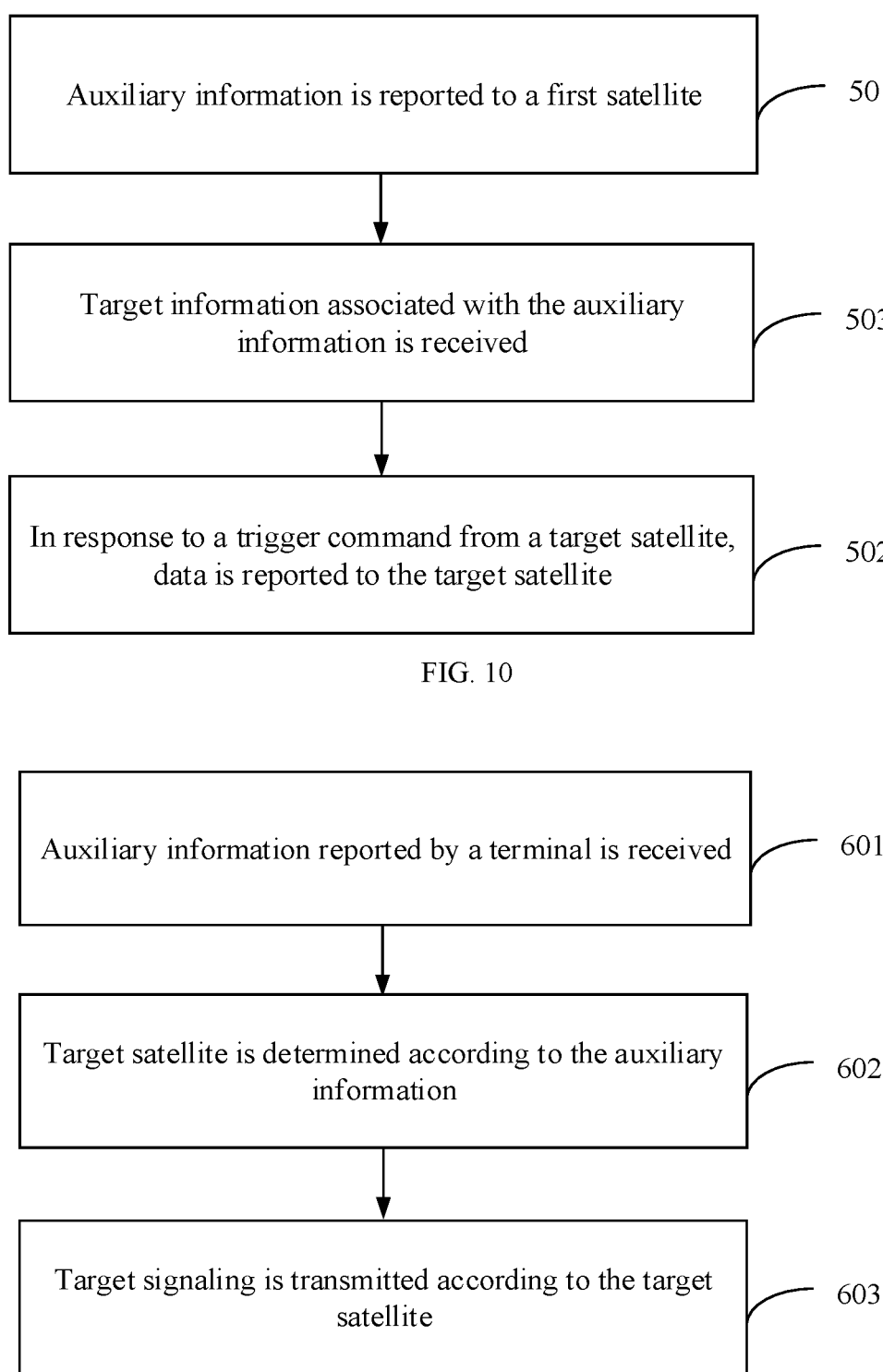
FIG. 10 is a schematic flowchart illustrating a data transmission method based on satellite communication according to an embodiment.
FIG. 11 is a schematic flowchart illustrating a data transmission method based on satellite communication according to an embodiment.

Referring to FIG. 10, FIG. 10 is a schematic flowchart illustrating a data transmission method based on satellite communication according to the embodiment shown in FIG. 9. The method can include the following step 503.

In step 503, target information associated with the auxiliary information is received.

In the embodiment of the present disclosure, after receiving the auxiliary information reported by the terminal, the first satellite can determine the target information for the terminal based on the auxiliary information. The target information is for the terminal reporting data, and includes at least resource location information for the terminal reporting data.

After receiving the trigger command from the target satellite, the terminal can report data to the target satellite on one or more resources indicated by the resource location information included in the previously received target information.

In the above embodiment, when reporting data to the target satellite, the terminal can report data according to the resource indication information included in the received trigger command, or the terminal can report data to the target satellite according to the resource indication information included in the previously received target information, thereby realizing the purpose of reporting data to the target satellite by the terminal based on the trigger command, and having high availability.

The embodiments of the present disclosure provide a data transmission method based on satellite communication, being applicable to a first satellite. Referring to FIG. 11, FIG. 11 is a schematic flowchart illustrating a data transmission method based on satellite communication according to an embodiment. The method can include the following steps.

In step 601, auxiliary information reported by a terminal is received.

The auxiliary information is information related to reporting data by the terminal, including but not limited to at least one of: a first period for the terminal performing data reporting, or a data volume for the terminal performing data reporting.

In the embodiment of the present disclosure, the first satellite can receive the auxiliary information reported by the terminal through an access procedure of a satellite system. In step 602, a target satellite is determined according to the auxiliary information.

The first satellite can determine a satellite that covers an area where the terminal is located at a starting time point of the first period as the target satellite, and the target satellite can be the first satellite, or a second satellite different from the first satellite.

In step 603, target signaling is transmitted according to the target satellite.

In the embodiment of the present disclosure, if the target satellite is the first satellite, the target signaling is a trigger command, where the trigger command is configured to trigger the terminal to report data. The first satellite can directly send the trigger command to the terminal at the starting time point of each first period to trigger the terminal to report data.

If the target satellite is the second satellite, the target signaling can be notification signaling, where the notification signaling is configured to notify the second satellite to send a trigger command to the terminal, and the trigger command is configured to trigger the terminal to report data. The first satellite can transmit the notification signaling to the second satellite at the starting time point of each first period to instruct the second satellite to send a trigger command to the terminal, so that the terminal can be triggered to report data to the second satellite.

In the above embodiment, after receiving the auxiliary information reported by the terminal, the first satellite can determine the target satellite, and then determine the target signaling to be transmitted and a receiving end of the target signaling, thereby realizing the purpose of reporting data to the target satellite by the terminal based on the trigger command from the target satellite, and effectively improving the efficiency of data transmission based on satellite communication.

In an alternative embodiment, the trigger command can be downlink control information, and a designated information field of the downlink control information includes at least a terminal identifier of the terminal, or data scheduled by the downlink control information includes at least a terminal identifier of the terminal, so that the terminal can determine whether a second reporting condition is met according to the trigger command.

In the above embodiment, the trigger command can include, but is not limited to, the downlink control information. When the trigger command is the downlink control information, the designated information field of the downlink control information includes at least the terminal identifier of the terminal, or data scheduled by the downlink control information includes at least the terminal identifier of the terminal. In this way, after receiving the trigger command, the terminal can report data to the target satellite based on the terminal identifier included in the downlink control information, thereby realizing the purpose of instructing the terminal to report data based on the trigger command.

In an alternative embodiment, the trigger command can include resource indication information.

Figure 12:
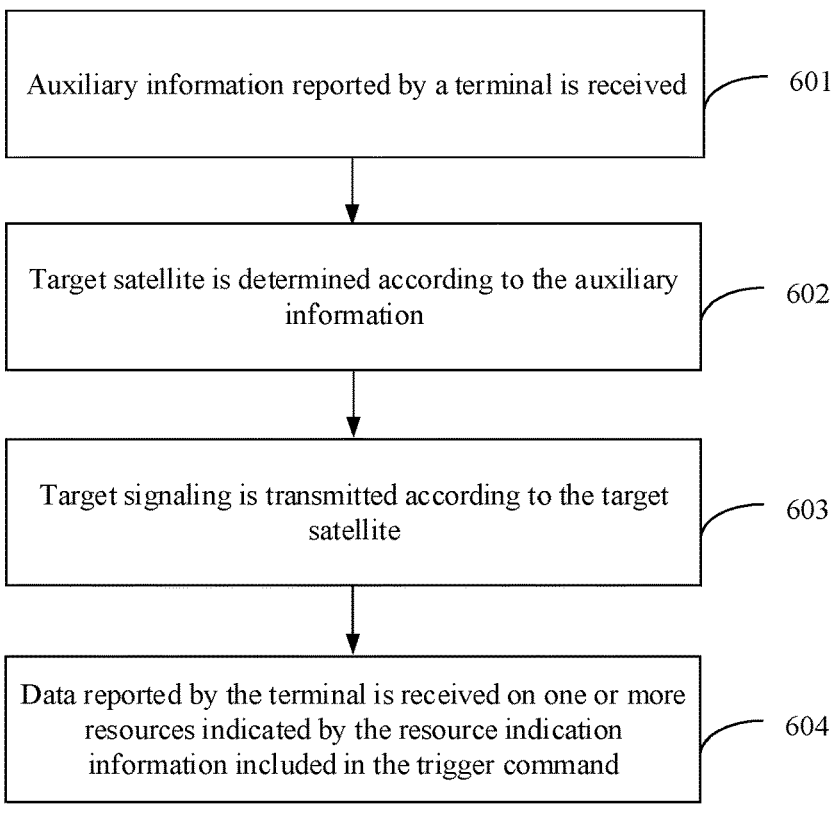
FIG. 12 is a schematic flowchart illustrating a data transmission method based on satellite communication according to an embodiment.

Referring to FIG. 12, FIG. 12 is a schematic flowchart illustrating a data transmission method based on satellite communication according to the embodiment shown in FIG. 11. The target satellite is the first satellite, and after the first satellite sends the trigger command to the terminal, the method can further include the following step 604.

In step 604, data reported by the terminal is received on one or more resources indicated by the resource indication information included in the trigger command.

In the embodiment of the present disclosure, the first satellite sends the trigger command to the terminal, and the first satellite can receive data reported by the terminal on one or more resources indicated by the resource indication information included in the sent trigger command.

In the above embodiment, for the first satellite, after sending the trigger command to the terminal to trigger the terminal to report data, the first satellite can receive data reported by the terminal on one or more resources indicated by the resource indication information included in the trigger command, thereby having high availability.

Figure 13:
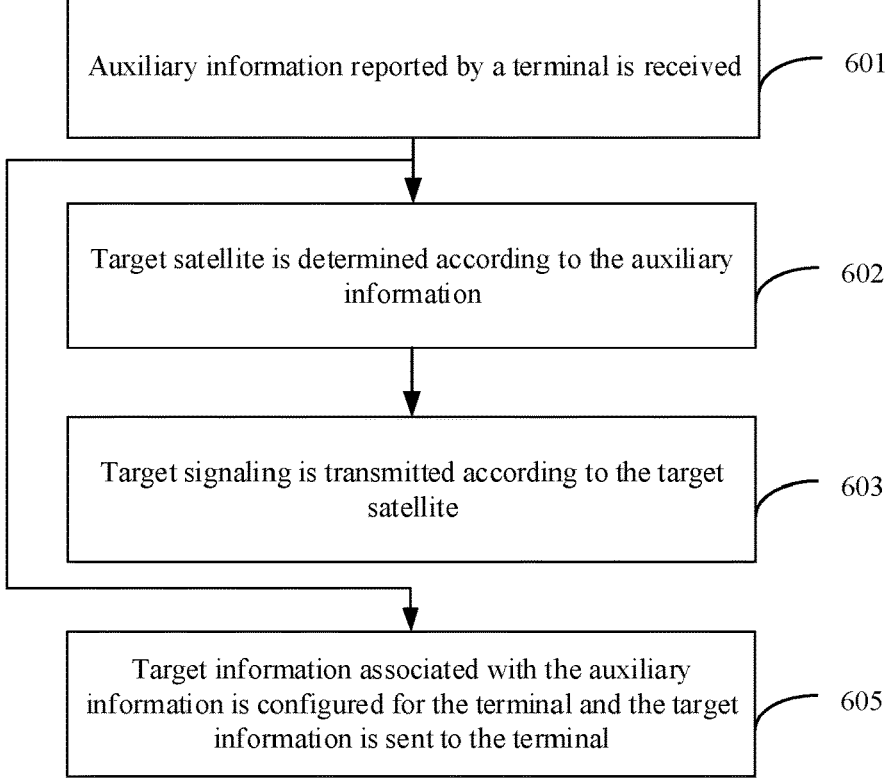
FIG. 13 is a schematic flowchart illustrating a data transmission method based on satellite communication according to an embodiment.

In an alternative embodiment, referring to FIG. 13, FIG. 13 is a schematic flowchart illustrating a data transmission method based on satellite communication according to the embodiment shown in FIG. 11. After step 601 is completed, the method can include the following step 605.

In step 605, target information associated with the auxiliary information is configured for the terminal, and the target information is sent to the terminal.

In the embodiment of the present disclosure, the target information is for the terminal reporting data and includes at least resource location information for the terminal reporting data.

The first satellite can send the target information to the terminal. If the terminal subsequently receives the trigger command sent by the second satellite, the terminal can report data to the second satellite on one or more resources indicated by the resource indication information included in the target information.

If the terminal subsequently receives the trigger command sent by the first satellite, the first satellite can also receive data reported by the terminal on one or more resources indicated by the resource indication information included in the target information.

In the above embodiment, the first satellite can determine the target information according to the auxiliary information reported by the terminal. Further, after receiving the trigger command sent by the target satellite, the terminal can report data to the target satellite on one or more resources indicated by the resource indication information included in the target information, thereby having high availability.

In an alternative embodiment, referring to FIG. 14, FIG. 14 is a schematic flowchart illustrating a data transmission method based on satellite communication according to an embodiment. The method can include the following steps.

In step 701, the terminal reports auxiliary information to a first satellite.

The auxiliary information is auxiliary information reported by the terminal through an access procedure of a satellite system, and is information related to reporting data by the terminal, including at least one of: a first period for the terminal performing data reporting, or a data volume for the terminal performing data reporting.

In step 702, the first satellite determines a satellite that covers an area where the terminal is located at a starting time point of the first period as the target satellite.

If the target satellite is the first satellite, step 703 is executed; and if the target satellite is a second satellite different from the first satellite, step 705 is executed.

In step 703, the first satellite sends a trigger command to the terminal at the starting time point of the first period.

The trigger command is configured to trigger the terminal to report data, and the trigger command can be downlink control information, where a designated information field of the downlink control information includes at least a terminal identifier of the terminal, or data scheduled by the downlink control information includes at least a terminal identifier of the terminal.

In step 704, in response to the trigger command that includes at least a terminal identifier of the terminal, the terminal reports data to the first satellite.

In step 705, the first satellite transmits notification signaling to the second satellite at the starting time point of the first period.

In step 706, the second satellite sends a trigger command to the terminal.

In step 707, in response to the trigger command that includes at least a terminal identifier of the terminal, the terminal reports data to the second satellite.

In the above embodiment, if the trigger command sent by the first satellite or the second satellite includes resource indication information, the terminal can report data to the first satellite or the second satellite on one or more resources indicated by the resource indication information included in the trigger command.

Alternatively, the trigger command may not include the resource indication information. After receiving the auxiliary information reported by the terminal, the first satellite determines the target information for the terminal, including at least the resource indication information, and sends the target information to the terminal. Further, after receiving the trigger command sent by the first satellite or the second satellite, the terminal reports data to the first satellite or the second satellite on one or more resources indicated by the resource indication information included in the target information.

In the above embodiment, the terminal can also report the auxiliary information to the first satellite, where the auxiliary information is information related to reporting data by the terminal. After receiving the trigger command from the target satellite, the terminal can report data to the target satellite, thereby avoiding situations such as communication latency and the terminal not getting service in time, and effectively improving the efficiency of data transmission based on satellite communication.

Corresponding to the foregoing examples of an application function implementation method, the present disclosure further provides examples of an application function implementation apparatus.

Referring to FIG. 15, FIG. 15 is a block diagram illustrating a data transmission apparatus based on satellite communication according to an embodiment. The apparatus is applied to a terminal and includes: a first reporting module 810 configured to report auxiliary information to a first satellite, where the auxiliary information is information related to reporting data by the terminal; and a first receiving module 820 configured to receive target information associated with the auxiliary information, where the target information is for the terminal reporting data.

Figure 16:
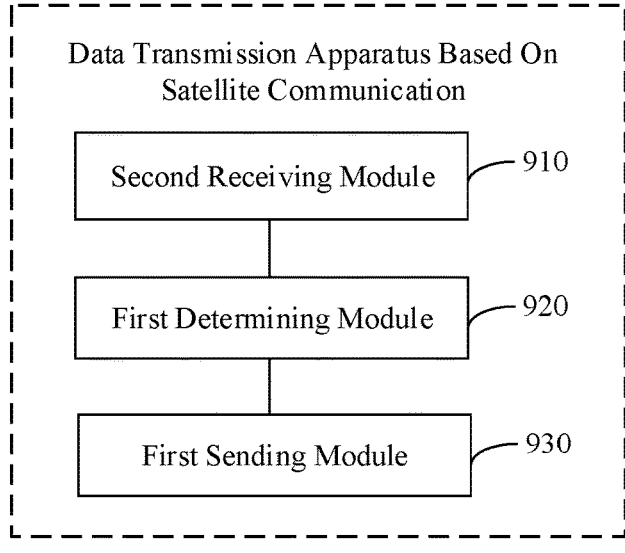
FIG. 16 is a block diagram illustrating a data transmission apparatus based on satellite communication according to an embodiment.

As shown in FIG. 16, FIG. 16 is a block diagram illustrating a data transmission apparatus based on satellite communication according to an embodiment. The apparatus is applied to a first satellite and includes: a second receiving module 910 configured to receive auxiliary information reported by a terminal, where the auxiliary information is information related to reporting data by the terminal; a first determining module 920 configured to determine target information for the terminal based on the auxiliary information, where the target information is for the terminal reporting data; and a first sending module 930 configured to send the target information to the terminal.

Figure 17:
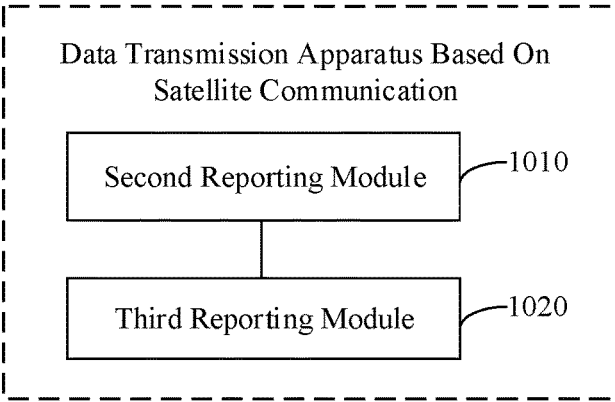
FIG. 17 is a block diagram illustrating a data transmission apparatus based on satellite communication according to an embodiment.

As shown in FIG. 17, FIG. 17 is a block diagram illustrating a data transmission apparatus based on satellite communication according to an embodiment. The apparatus is applied to a terminal and includes: a second reporting module 1010 configured to report auxiliary information to a first satellite, where the auxiliary information is information related to reporting data by the terminal; and a third reporting module 1020 configured to, in response to a trigger command from a target satellite, report data to the target satellite.

Figure 18:
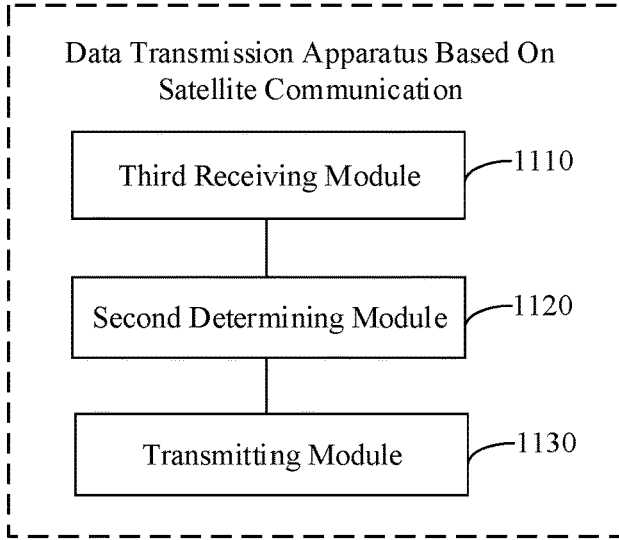
FIG. 18 is a block diagram illustrating a data transmission apparatus based on satellite communication according to an embodiment.

As shown in FIG. 18, FIG. 18 is a block diagram illustrating a data transmission apparatus based on satellite communication according to an embodiment. The apparatus is applied to a first satellite and includes: a third receiving module 1110 configured to receive auxiliary information reported by a terminal, where the auxiliary information is information related to reporting data by the terminal; a second determining module 1120 configured to determine a target satellite according to the auxiliary information; and a transmitting module 1130 configured to transmit target signaling according to the target satellite.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the purposes of the solutions of the present disclosure. Those skilled in the art may understand and implement without creative labor.

Accordingly, the present disclosure further provides a non-transitory computer-readable storage medium storing a computer program, where the computer program is configured to execute the data transmission method based on satellite communication described in any one of the above embodiments, being applicable to a terminal side.

Accordingly, the present disclosure further provides a computer readable storage medium storing a computer program, where the computer program is configured to execute the data transmission method based on satellite communication described in any one of the above embodiments being applicable to a first satellite side.

Accordingly, the present disclosure further provides a data transmission apparatus based on satellite communication, being applicable to a terminal, including: a processor; and a memory for storing instructions executable by the processor, where the processor is configured to execute the data transmission method based on satellite communication described in any one of the above embodiments, being applicable to a terminal side.

Figure 19:
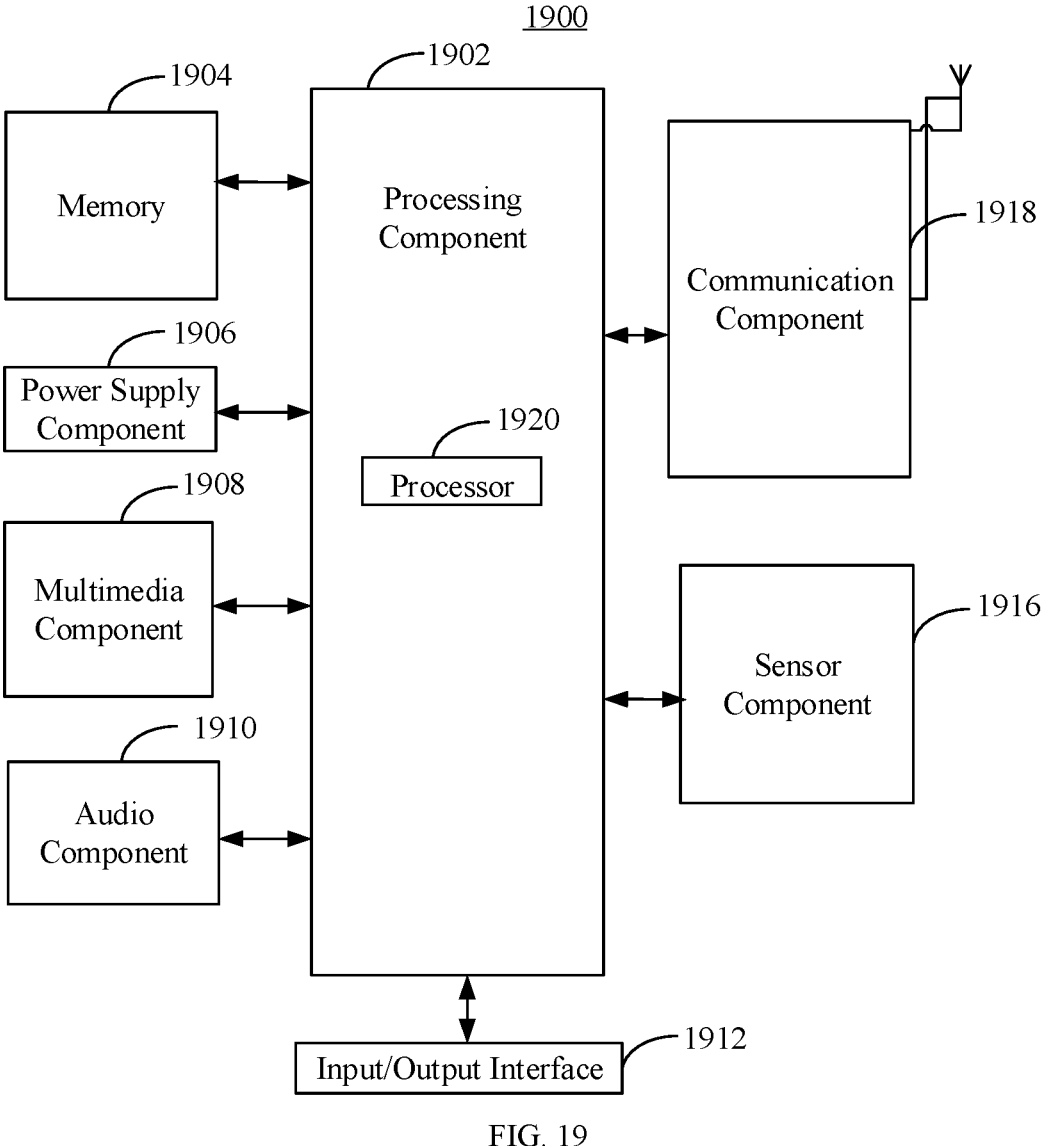
FIG. 19 is a schematic structural diagram illustrating an electronic device according to an embodiment.

FIG. 19 is a schematic structural diagram illustrating an electronic device 1900 according to an embodiment. For example, the electronic device 1900 can be a terminal such as a mobile phone, a tablet computer, an e-book reader, a multimedia playback device, a wearable device, a vehicle-mounted terminal, an iPad®, a smart TV, and the like.

Referring to FIG. 19, the electronic device 1900 may include one or more of the following components: a processing component 1902, a memory 1904, a power supply component 1906, a multimedia component 1908, an audio component 1910, an input/output (I/O) interface 1912, a sensor component 1916, and a communication component 1918.

The processing component 1902 generally controls the overall operations of the electronic device 1900, such as operations associated with display, phone calls, data communications, camera operations, and recording operations. The processing component 1902 may include one or more processors 1920 to execute instructions to complete all or part of the steps of the above data transmission method based on satellite communication. In addition, the processing component 1902 may include one or more modules that facilitate the interaction between the processing component 1902 and other components. For example, the processing component 1902 may include a multimedia module to facilitate the interaction between the multimedia component 1908 and the processing component 1902. For another example, the processing component 1902 can read executable instructions from the memory to implement the steps of the data transmission method based on satellite communication provided by the above embodiments.

The memory 1904 is to store various types of data to support the operation of the electronic device 1900. Examples of such data include instructions for any application or method operated on the electronic device 1900, contact data, phonebook data, messages, pictures, videos, and so on. The memory 1904 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 1906 provides power to different components of the electronic device 1900. The power supply component 1906 may include a power management system, one or more power supplies, and other components associated with generating, managing, and distributing power for the electronic device 1900.

The multimedia component 1908 includes a screen providing an output interface between the electronic device 1900 and a user. In some embodiments, the multimedia component 1908 may include a front camera and/or a rear camera. The front camera and/or rear camera may receive external multimedia data when the electronic device 1900 is in an operating mode, such as a photographing mode or a video mode. Each of the front and rear cameras may be a fixed optical lens system or have focal length and optical zooming capability.

The audio component 1910 is configured to output and/or input an audio signal. For example, the audio component 1910 includes a microphone (MIC). When the electronic device 1900 is in an operating mode, such as a call mode, a recording mode, and a voice recognition mode, the MIC receives an external audio signal. The received audio signal may be further stored in the memory 1904 or transmitted via the communication component 1918. In some embodiments, the audio component 1910 further includes a speaker to output an audio signal.

The I/O interface 1912 may provide an interface between the processing component 1902 and peripheral interface modules. The above peripheral interface modules may include a keyboard, a click wheel, buttons, and so on. These buttons may include, but are not limited to, a home button, a volume button, a starting button, and a locking button.

The sensor component 1916 includes one or more sensors to provide status assessments of various aspects for the electronic device 1900. For example, the sensor component 1916 may detect the on/off status of the electronic device 1900, and the relative positioning of the component, for example, the component is a display and a keypad of the electronic device 1900. The sensor component 1916 may also detect a change in position of the electronic device 1900 or a component of the electronic device 1900, a presence or absence of the contact between a user and the electronic device 1900, an orientation or an acceleration/deceleration of the electronic device 1900, and a change in temperature of the electronic device 1900. The sensor component 1916 may include a proximity sensor to detect the presence of a nearby object without any physical contact. The sensor component 1916 may further include an optical sensor, such as a Complementary Metal Oxide Semiconductor (CMOS) or Charge-coupled Device (CCD) image sensor, which is used in imaging applications. In some embodiments, the sensor component 1916 may further include an acceleration sensor, a gyroscope sensor, a magnetic sensor, a pressure sensor, or a temperature sensor.

The communication component 1918 is configured to facilitate wired or wireless communication between the electronic device 1900 and other devices. The electronic device 1900 may access a wireless network that is based on a communication standard, such as Wi-Fi, 2G, 3G, 4G, or 5G, or a combination thereof. In an embodiment, the communication component 1918 receives a broadcast signal or broadcast-associated information from an external broadcast management system via a broadcast channel. In an embodiment, the communication component 1918 further includes a Near Field Communication (NFC) module to facilitate short-range communications. For example, the NFC module may be implemented based on Radio Frequency Identifier (RFID) technology, Infrared Data Association (IrDA) technology, Ultra-Wide Band (UWB) technology, Bluetooth (BT) technology, and other technologies.

In an embodiment, the electronic device 1900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above data transmission method based on satellite communication.

In an embodiment, there is also provided a non-transitory computer-readable storage medium including instructions, such as the memory 1904. The instructions may be executed by the processor 1920 of the electronic device 1900 to perform the above data transmission method based on satellite communication. For example, the non-transitory computer-readable storage medium may be a ROM, a Random Access Memory (RAM), a CD-ROM, a magnetic tape, a floppy disk, an optical data storage device, and the like.

Accordingly, the present disclosure further provides a data transmission apparatus based on satellite communication, being applicable to a first satellite, including: a processor; and a memory for storing instructions executable by the processor, where the processor is configured to execute the data transmission method based on satellite communication described in any one of the above embodiments, being applicable to a first satellite side.

Figure 20:
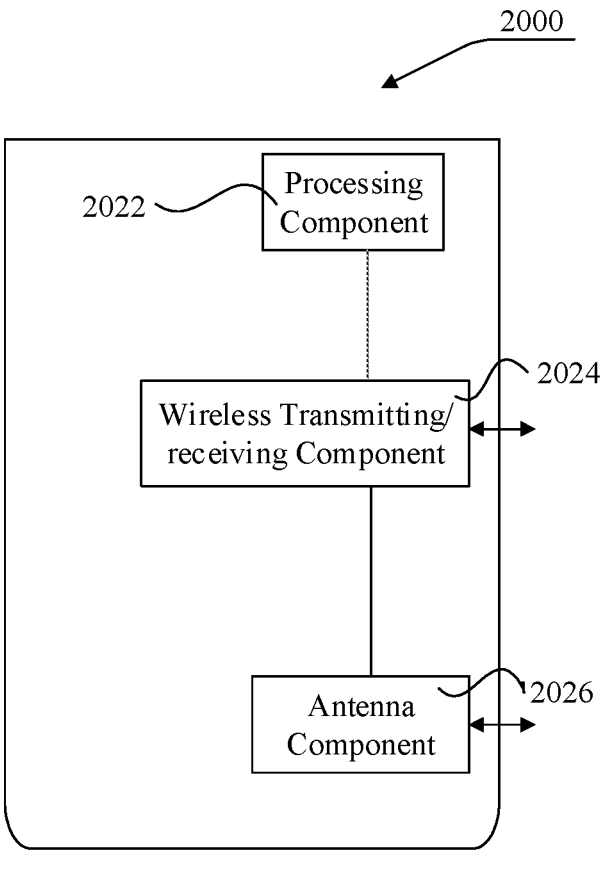
FIG. 20 is a schematic structural diagram illustrating a data transmission apparatus based on satellite communication according to an embodiment.

As shown in FIG. 20, FIG. 20 is a schematic structural diagram illustrating a data transmission apparatus based on satellite communication according to an embodiment. The apparatus 2000 can be provided as a satellite. Referring to FIG. 20, the apparatus 2000 includes a processing component 2022, a wireless transmitting/receiving component 2024, an antenna component 2026, and a signal processing part specific to a wireless interface. The processing component 2022 can further include one or more processors.

One of the processors in the processing component 2022 can be configured to implement the data transmission method based on satellite communication described in any one of the above embodiments, being applicable to the satellite side.

According to an aspect of the embodiments of the present disclosure, there is provided a data transmission method based on satellite communication, being applicable to a terminal, including: reporting auxiliary information to a first satellite, where the auxiliary information is information related to reporting data by the terminal; and receiving target information associated with the auxiliary information, where the target information is for the terminal reporting data.

In some embodiments, the auxiliary information is reported through an access procedure of a satellite system.

In some embodiments, the method further includes: reporting data to a target satellite based on the target information.

In some embodiments, the auxiliary information includes at least one of: a first period for the terminal performing data reporting, or a data volume for the terminal performing data reporting.

In some embodiments, the target information includes at least one of: a second period for the terminal reporting data, resource location information for the terminal reporting data, or transmission parameter information for the terminal reporting data.

In some embodiments, the target satellite is the first satellite, and reporting data to the target satellite based on the target information includes: in response to determining that the first satellite covers an area where the terminal is located, reporting data to the first satellite.

In some embodiments, the target satellite is a second satellite that covers the area where the terminal is located at a starting time point of the second period, and the method further includes: receiving target access information sent by the first satellite, where the target access information is information for accessing the second satellite; wherein reporting data to the target satellite based on the target information includes: in response to reaching the starting time point of the second period, accessing the second satellite according to the target access information; and reporting data to the second satellite.

In some embodiments, reporting data to the target satellite based on the target information includes: reporting data to the target satellite on one or more resources indicated by the resource location information.

According to an aspect of the embodiments of the present disclosure, there is provided a data transmission method based on satellite communication, being applicable to a first satellite, including: receiving auxiliary information reported by a terminal, where the auxiliary information is information related to reporting data by the terminal; determining target information for the terminal based on the auxiliary information, where the target information is for the terminal reporting data; and sending the target information to the terminal.

In some embodiments, receiving the auxiliary information reported by the terminal includes: receiving the auxiliary information reported by the terminal through an access procedure of a satellite system.

In some embodiments, the auxiliary information includes at least one of: a first period for the terminal performing data reporting, or a data volume for the terminal performing data reporting.

In some embodiments, the target information includes at least one of: a second period for the terminal reporting data, resource location information for the terminal reporting data, or transmission parameter information for the terminal reporting data.

In some embodiments, after sending the target information to the terminal, the method further includes: receiving data reported by the terminal on one or more resources indicated by the resource location information.

In some embodiments, the method further includes: sending target access information to the terminal, where the target access information is information for instructing the terminal to access a second satellite that covers the area where the terminal is located at a starting time point of the second period.

According to an aspect of the embodiments of the present disclosure, there is provided a data transmission method based on satellite communication, is applicable to a terminal, including: reporting auxiliary information to a first satellite, where the auxiliary information is information related to reporting data by the terminal; and in response to a trigger command from a target satellite, reporting data to the target satellite.

In some embodiments, the auxiliary information is reported through an access procedure of a satellite system.

In some embodiments, the auxiliary information includes at least one of: a first period for the terminal performing data reporting, or a data volume for the terminal performing data reporting.

In some embodiments, the target satellite is a satellite that covers an area where the terminal is located at a starting time point of the first period.

In some embodiments, in response to a trigger command from a target satellite, reporting data to the target satellite includes: in response to the trigger command from the target satellite including at least a terminal identifier of the terminal, reporting data to the target satellite.

In some embodiments, reporting data to the target satellite includes: reporting data to the target satellite on one or more resources indicated by resource location information included in the trigger command.

In some embodiments, the method further includes: receiving target information associated with the auxiliary information, where the target information is for the terminal reporting data and includes at least resource location information for the terminal reporting data; and reporting data to the target satellite includes: reporting data to the target satellite on one or more resources indicated by resource location information included in the target information.

According to an aspect of the embodiments of the present disclosure, there is provided a data transmission method based on satellite communication, that is applicable to a first satellite, including: receiving auxiliary information reported by a terminal, where the auxiliary information is information related to reporting data by the terminal; determining a target satellite according to the auxiliary information; and transmitting target signaling according to the target satellite.

In some embodiments, receiving the auxiliary information reported by the terminal includes: receiving the auxiliary information reported by the terminal through an access procedure of a satellite system.

In some embodiments, the auxiliary information includes at least one of: a first period for the terminal performing data reporting, or a data volume for the terminal performing data reporting.

In some embodiments, determining the target satellite according to the auxiliary information includes: determining a satellite that covers an area where the terminal is located at a starting time point of the first period as the target satellite.

In some embodiments, the target satellite is the first satellite, and transmitting the target signaling includes: sending a trigger command to the terminal at the starting time point of the first period, where the trigger command is configured to trigger the terminal to report data.

In some embodiments, the trigger command is downlink control information, and a designated information field of the downlink control information includes at least a terminal identifier of the terminal, or data scheduled by the downlink control information includes at least a terminal identifier of the terminal.

In some embodiments, the trigger command includes resource indication information, and after sending the trigger command to the terminal, the method further includes: receiving data reported by the terminal on one or more resources indicated by the resource indication information included in the trigger command.

In some embodiments, after receiving the auxiliary information reported by the terminal, the method further includes: configuring target information associated with the auxiliary information for the terminal and sending the target information to the terminal, where the target information is for the terminal reporting data and includes at least resource location information for the terminal reporting data; and after sending the trigger command to the terminal, the method further includes: receiving data reported by the terminal on one or more resources indicated by the resource indication information included in the target information.

In some embodiments, the target satellite is a second satellite, and transmitting the target signaling includes: transmitting notification signaling to the second satellite at the starting time point of the first period, where the notification signaling is configured to notify the second satellite to send a trigger command to the terminal, and the trigger command is configured to trigger the terminal to report data.

Technical solutions provided by the embodiments of the present disclosure may include the following beneficial effects.

In the embodiments of the present disclosure, the terminal can report the auxiliary information to the first satellite, where the auxiliary information is information related to reporting data by the terminal. The terminal can receive the target information associated with the auxiliary information, where the target information is for the terminal reporting data. Further, the terminal can report data to the target satellite based on the target information, thereby effectively improving the efficiency of data transmission based on satellite communication and increasing the availability of the communication system.

In the embodiments of the present disclosure, if the target satellite is the first satellite, the terminal can report data to the first satellite when the first satellite covers the area where the terminal is located, thereby avoiding situations such as communication latency and the terminal not getting service in time, and effectively improving the efficiency of data transmission based on satellite communication.

In the embodiments of the present disclosure, the target satellite can be the second satellite, different from the first satellite, that covers the area where the terminal is located at the starting time point of the second period. In response to reaching the starting time point of the second period, the terminal can access the second satellite according to the target access information and report data to the second satellite, thereby avoiding situations such as communication latency and the terminal not getting service in time, and effectively improving the efficiency of data transmission based on satellite communication.

In the embodiments of the present disclosure, the terminal can determine one or more resources according to the target information configured by the first satellite for the terminal, and report data to the target satellite on the resources, thereby realizing the purpose of reporting data to the target satellite by the terminal, and having high availability.

In the embodiments of the present disclosure, the terminal can also report the auxiliary information to the first satellite, where the auxiliary information is information related to reporting data by the terminal. In response to the trigger command from the target satellite, the terminal can report data to the target satellite, thereby avoiding situations such as communication latency and the terminal not getting service in time, and effectively improving the efficiency of data transmission based on satellite communication.

In the embodiments of the present disclosure, the target satellite is the satellite that covers an area where the terminal is located at the starting time point of the first period, and the target satellite can be the first satellite or the second satellite, different from the first satellite. The terminal can perform data reporting based on the trigger command from the target satellite, thereby effectively improving the efficiency of data transmission based on satellite communication.

In the embodiments of the present disclosure, if the target satellite is the first satellite, the first satellite can directly send the trigger command to the terminal at the starting time point of the first period, so that the terminal can report data. If the target satellite is the second satellite different from the first satellite, the first satellite can send the notification signaling to the second satellite at the starting time point of the first period, so that the second satellite can send the trigger command to the terminal according to the notification signaling to trigger the terminal to report data, thereby easily realizing, and having high availability.

In the embodiments of the present disclosure, the trigger command can be downlink control information, where the designated information field of the downlink control information includes at least the terminal identifier of the terminal, or data scheduled by the downlink control information includes at least the terminal identifier of the terminal, so that the terminal can be triggered to perform data reporting subsequently, thereby having high availability.

In the embodiments of the present disclosure, the trigger command can include resource indication information, so that the terminal can report data to the target satellite on one or more resources indicated by the resource indication information. Alternatively, after receiving the auxiliary information reported by the terminal, the first satellite can determine the target information for the terminal based on the auxiliary information, and the target information includes at least resource location information for the terminal reporting data. The first satellite can send the target information to the terminal, and the terminal can report data to the target satellite on one or more resources indicated by the resource indication information included in the target information after receiving the trigger command from the target satellite, thereby realizing the purpose of instructing the terminal to report data to the target satellite based on the trigger command, and having high availability.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the art that are not disclosed in the present disclosure. The specification and examples are considered exemplary only, with a true scope and spirit of the present disclosure being indicated by the following claims.

It should be understood that the present disclosure is not limited to the above-described structures shown in the drawings, and various modifications and changes can be made to the present disclosure without departing from the scope thereof.

21                                                                      22

The invention claimed is:

1. A data transmission method based on satellite communication, being applicable to a terminal, comprising:
   reporting auxiliary information to a first satellite, wherein the auxiliary information is information related to reporting data by the terminal; and
   receiving target information associated with the auxiliary information from the first satellite, wherein the target information is for the terminal reporting data to a target satellite;
   wherein the target information comprises at least one of:
      a second period for the terminal reporting data, resource location information for the terminal reporting data, or transmission parameter information for the terminal reporting data; and
   wherein the target information at least comprises the second period for the terminal reporting data;
   wherein the target satellite is a second satellite which covers an area where the terminal is located at a starting time point of the second period, and
   wherein the method further comprises:
      receiving target access information sent by the first satellite, wherein the target access information is information for accessing the second satellite;
      in case of reaching the starting time point of the second period, accessing the second satellite according to the target access information; and
      reporting data to the second satellite.

2. The method according to claim 1, wherein the auxiliary information is reported through an access procedure of a satellite system.

3. The method according to claim 1, wherein the auxiliary information comprises at least one of:
   a first period for the terminal performing data reporting; or
   a data volume for the terminal performing data reporting.

4. The method according to claim 1, wherein reporting data to the second satellite comprises:
   reporting the data to the second satellite on one or more resources indicated by the resource location information.

5. A data transmission method based on satellite communication, being applicable to a first satellite, comprising:
   receiving auxiliary information reported by a terminal, wherein the auxiliary information is information related to reporting data by the terminal;
   determining target information for the terminal based on the auxiliary information, wherein the target information is for the terminal reporting data to a target satellite; and
   sending the target information to the terminal;
   wherein the target information comprises at least one of:
      a second period for the terminal reporting data, resource location information for the terminal reporting data, or transmission parameter information for the terminal reporting data; and
   wherein the target information at least comprises the second period for the terminal reporting data;
   wherein the method further comprises:
   sending target access information to the terminal, wherein the target access information is for instructing the terminal to access the target satellite at a starting time point of the second period, and report data to the target satellite; wherein the target satellite is a second satellite which covers an area where the terminal is located at the starting time point of the second period.

6. The method according to claim 5, wherein receiving the auxiliary information reported by the terminal comprises:
   receiving the auxiliary information reported by the terminal through an access procedure of a satellite system.

7. The method according to claim 5, wherein the auxiliary information comprises at least one of:
   a first period for the terminal performing data reporting; or
   a data volume for the terminal performing data reporting.

8. The method according to claim 5, further comprising:
   determining the second satellite according to the auxiliary information; and
   transmitting target signaling according to the second satellite.

9. A non-transitory computer readable storage medium storing a computer program, wherein the computer program when executed by a processor causes the processor execute the method according to claim 1.

10. A non-transitory computer readable storage medium storing a computer program, wherein the computer program when executed by a processor causes the processor to execute the method according to claim 5.

11. A data transmission terminal that utilizes satellite communication, the data transmission terminal comprising:
   a processor; and
   a memory for storing instructions executable by the processor,
   wherein the instructions when executed by the processor cause the processor to:
   report auxiliary information to a first satellite, wherein the auxiliary information is information related to reporting data by the terminal; and
   receive target information associated with the auxiliary information from the first satellite, wherein the target information is for the terminal reporting data to a target satellite;
   wherein the target information comprises at least one of:
      a second period for the terminal reporting data, resource location information for the terminal reporting data, or transmission parameter information for the terminal reporting data; and
   wherein the target information at least comprises the second period for the terminal reporting data;
   wherein the target satellite is a second satellite which covers an area where the terminal is located at a starting time point of the second period, and
   wherein the instructions when executed by the processor cause the processor to:
      receive target access information sent by the first satellite, wherein the target access information is information for accessing the second satellite;
      in case of reaching the starting time point of the second period, access the second satellite according to the target access information; and
      report data to the second satellite.

12. A data transmission satellite for satellite communication, the data transmission satellite comprising:
   a processor; and
   a memory for storing instructions executable by the processor,
   wherein the instructions when executed by the processor cause the processor to execute the method according to claim 5.

13. The data transmission terminal according to claim 11, wherein the auxiliary information is reported through an access procedure of a satellite system.

14. The data transmission terminal according to claim 11, wherein the auxiliary information comprises at least one of:

a first period for the terminal performing data reporting; or a data volume for the terminal performing data reporting.

15. The data transmission terminal according to claim 11, wherein the instructions when executed by the processor cause the processor to:

report the data to the second satellite on one or more resources indicated by the resource location information.

\* \* \* \* \*